US010759336B2

(12) United States Patent
Tanaka

(10) Patent No.: US 10,759,336 B2
(45) Date of Patent: Sep. 1, 2020

(54) VEHICLE PERIPHERY INFORMATION MANAGEMENT DEVICE

(71) Applicant: Hitachi Automotive Systems, Ltd., Hitachinaka-shi, Ibaraki (JP)

(72) Inventor: Yuya Tanaka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/663,712

(22) Filed: Oct. 25, 2019

(65) Prior Publication Data

US 2020/0055447 A1 Feb. 20, 2020

Related U.S. Application Data

(63) Continuation of application No. 15/576,956, filed as application No. PCT/JP2016/071198 on Jul. 20, 2016, now Pat. No. 10,493,907.

(30) Foreign Application Priority Data

Jul. 31, 2015 (JP) .................................. 2015-151449

(51) Int. Cl.
*B60Q 1/50* (2006.01)
*G06K 9/00* (2006.01)
*G06T 1/00* (2006.01)
*G08G 1/16* (2006.01)

(52) U.S. Cl.
CPC .......... *B60Q 1/50* (2013.01); *G06K 9/00791* (2013.01); *G06K 9/00798* (2013.01); *G06K 9/00805* (2013.01); *G06T 1/00* (2013.01); *G08G 1/16* (2013.01)

(58) Field of Classification Search
CPC ......... G08G 1/165; G08G 1/167; B60Q 9/008
USPC ......... 340/435, 436; 701/36, 1, 201, 48, 102
See application file for complete search history.

(56) References Cited

U.S. PATENT DOCUMENTS

| 6,408,247 B1 | 6/2002 | Ichikawa et al. |
| 8,352,112 B2 | 1/2013 | Mudalige |
| 9,632,502 B1 * | 4/2017 | Levinson ............. G01S 7/4972 |
| 2004/0083043 A1 | 4/2004 | Akiyama et al. |

(Continued)

FOREIGN PATENT DOCUMENTS

| EP | 2 093 741 A1 | 8/2009 |
| JP | 9-257924 A | 10/1997 |

(Continued)

OTHER PUBLICATIONS

International Search Report (PCT/ISA/210) issued in PCT Application No. PCT/JP2016/071198 dated Nov. 1, 2016 with English translation (Four (4) pages).

(Continued)

*Primary Examiner* — Eric Blount
(74) *Attorney, Agent, or Firm* — Crowell & Moring LLP

(57) ABSTRACT

A vehicle periphery information management device includes a data acquisition unit, and a data selection unit. The data acquisition unit is configured to acquire a plurality of pieces of external environment information data around a vehicle. The data selection unit is configured to select apart of the plurality of pieces of external environment information data acquired by the data acquisition unit so as to make an output outside, based on a predetermined position of the vehicle.

8 Claims, 17 Drawing Sheets

(56) References Cited

U.S. PATENT DOCUMENTS

| | | | |
|---|---|---|---|
| 2005/0134440 A1 | 6/2005 | Breed | |
| 2008/0215231 A1* | 9/2008 | Breed | G08G 1/161 |
| | | | 701/117 |
| 2010/0104199 A1 | 4/2010 | Zhang | |
| 2012/0053755 A1 | 3/2012 | Takagi | |
| 2012/0065841 A1 | 3/2012 | Nagata et al. | |
| 2012/0161951 A1* | 6/2012 | Ito | B60Q 9/008 |
| | | | 340/435 |
| 2012/0323479 A1 | 12/2012 | Nagata | |
| 2013/0116859 A1 | 5/2013 | Ihlenburg et al. | |
| 2014/0219510 A1* | 8/2014 | Nagaoka | B60W 30/09 |
| | | | 382/104 |
| 2014/0358420 A1 | 12/2014 | Noh | |
| 2015/0061895 A1* | 3/2015 | Ricci | G06F 16/25 |
| | | | 340/902 |

FOREIGN PATENT DOCUMENTS

| | | |
|---|---|---|
| JP | 2000-310677 A | 11/2000 |
| JP | 2003-217099 A | 7/2003 |
| JP | 2004-136816 A | 5/2004 |
| JP | 2006-285335 A | 10/2006 |
| JP | 2009-96274 A | 5/2009 |
| JP | 2009-187351 A | 8/2009 |
| JP | 2011-227582 A | 11/2011 |
| JP | 2011-257984 A | 12/2011 |
| JP | 2012-133686 A | 7/2012 |
| WO | WO 2010/140239 A1 | 12/2010 |
| WO | WO 2011/101988 A1 | 8/2011 |

OTHER PUBLICATIONS

Japanese-language Written Opinion (PCT/ISA/237) issued in PCT Application No. PCT/JP2016/071198 dated Nov. 1, 2016 (Five (5) pages).

Japanese-language Office Action issued in counterpart Japanese Application No. 2017-532476 dated Nov. 27, 2018 with English translation (seven (7) pages).

Extended European Search Report issued in counterpart European Application No. 16832754.2 dated Jun. 4, 2019 (12 pages).

* cited by examiner

FIG. 14

| VEHICLE PERIPHERY INFORMATION OBJECT CLASSIFICATION | | | DESCRIPTIONS | DEFAULT CYCLE | FILTER CYCLE |
|---|---|---|---|---|---|
| PERIPHERY THREE-DIMENSIONAL OBJECT | OBJECT | OBJECT ID | | 60ms | 500ms |
| | | RELATIVE POSITION | | 60ms | 500ms |
| | | RELATIVE SPEED | | 60ms | 500ms |
| | | WIDTH | | 60ms | 500ms |
| | | HEIGHT | | 60ms | 500ms |
| | | CLASSIFICATION | | 60ms | 500ms |
| | | CURRENT LANE | | 60ms | 500ms |
| | | PREDICTED TRACK | | 60ms | 500ms |
| | | BRAKE LAMP LIGHTING DETERMINATION | BRAKE LAMP LIGHTING DETERMINATION OF LEADING VEHICLE | 60ms | 500ms |
| | | LAP RATE | LAP RATE [%] = LAP WIDTH/VEHICLE WIDTH | 60ms | 500ms |
| | | INDICATOR DETERMINATION | INDICATOR LIGHTING DETERMINATION OF LEADING VEHICLE | 60ms | 500ms |
| | | RELIABILITY | | 60ms | 500ms |
| | SIGNAL | SIGNAL ID | | 100ms | 500ms |
| | | CLASSIFICATION | | 100ms | 500ms |
| | | RELATIVE POSITION | | 100ms | 500ms |
| | | STATE | RED, BLUE, YELLOW, FLASHING IN RED, FLASHING IN YELLOW, ... | 100ms | 500ms |
| | | RELIABILITY | | 100ms | 500ms |
| | SIGN | SIGN ID | | 100ms | 500ms |
| | | CLASSIFICATION | STOP, SPEED, ... | 100ms | 500ms |
| | | RELATIVE POSITION | | 100ms | 500ms |
| | | DISPLAYED DESCRIPTION | 40km/h, 80km/h, ... | 100ms | 500ms |
| | | RELIABILITY | | 100ms | 500ms |
| | ROAD END | RELATIVE POSITION | | 100ms | 500ms |
| | | CLASSIFICATION | GUARDRAIL, SIDE WALL, ... | 100ms | 500ms |
| | | RELIABILITY | | 100ms | 500ms |
| PERIPHERY ROAD SURFACE INFORMATION | LANE MARKER | LANE ID | | 100ms | 500ms |
| | | LANE CLASSIFICATION | TRAVEL LANE OF VEHICLE/LEFT SIDE TRAFFIC LANE/RIGHT SIDE TRAFFIC LANE | 100ms | 500ms |
| | | RELATIVE POSITION | | 100ms | 500ms |
| | | YAW ANGLE | | 100ms | 500ms |
| | | LANE MARKER ID | | 100ms | 500ms |
| | | LANE MARKER CLASSIFICATION | BROKEN LINE, SOLID LINE, ... | 100ms | 500ms |
| | | LANE MARKER CENTER LINE | | 100ms | 500ms |
| | | LANE WIDTH | | 100ms | 500ms |
| | | RELIABILITY | | 100ms | 500ms |
| | ADDITIONAL PAINT | PAINT ID | | 100ms | 500ms |
| | | RELATIVE POSITION | | 100ms | 500ms |
| | | CLASSIFICATION | STOP LINE, NO ENTRY, ... | 100ms | 500ms |
| | | REGION DISPLAY | | 100ms | 500ms |
| | | RELIABILITY | | 100ms | 500ms |

FIG. 15

| VEHICLE PERIPHERY INFORMATION OBJECT CLASSIFICATION | | | DESCRIPTIONS | TRANSMISSION DESCRIPTIONS IN DEFAULT | TRANSMISSION DESCRIPTIONS AFTER FILTERING |
|---|---|---|---|---|---|
| PERIPHERY THREE-DIMENSIONAL OBJECT | OBJECT | OBJECT ID | | ○ | ○ |
| | | RELATIVE POSITION | | ○ | ○ |
| | | RELATIVE SPEED | | ○ | ○ |
| | | WIDTH | | ○ | |
| | | HEIGHT | | ○ | |
| | | CLASSIFICATION | | ○ | |
| | | CURRENT LANE | | ○ | |
| | | PREDICTED TRACK | | ○ | |
| | | BRAKE LAMP LIGHTING DETERMINATION | BRAKE LAMP LIGHTING DETERMINATION OF LEADING VEHICLE | ○ | |
| | | LAP RATE | LAP RATE [%] = LAP WIDTH/VEHICLE WIDTH | ○ | |
| | | INDICATOR DETERMINATION | INDICATOR LIGHTING DETERMINATION OF LEADING VEHICLE | ○ | |
| | | RELIABILITY | | ○ | |
| | SIGNAL | SIGNAL ID | | ○ | ○ |
| | | CLASSIFICATION | | ○ | ○ |
| | | RELATIVE POSITION | | ○ | ○ |
| | | STATE | RED, BLUE, YELLOW, FLASHING IN RED, FLASHING IN YELLOW, ... | ○ | ○ |
| | | RELIABILITY | | ○ | |
| | SIGN | SIGN ID | | ○ | ○ |
| | | CLASSIFICATION | STOP, SPEED, ... | ○ | ○ |
| | | RELATIVE POSITION | | ○ | ○ |
| | | DISPLAYED DESCRIPTION | 40km/h, 80km/h, ... | ○ | ○ |
| | | RELIABILITY | | ○ | |
| | ROAD END | RELATIVE POSITION | | ○ | ○ |
| | | CLASSIFICATION | GUARDRAIL, SIDE WALL, ... | ○ | ○ |
| | | RELIABILITY | | ○ | |
| PERIPHERY ROAD SURFACE INFORMATION | LANE MARKER | LANE ID | | ○ | ○ |
| | | LANE CLASSIFICATION | TRAVEL LANE OF VEHICLE/LEFT SIDE TRAFFIC LANE/RIGHT SIDE TRAFFIC LANE | ○ | ○ |
| | | RELATIVE POSITION | | ○ | ○ |
| | | YAW ANGLE | | ○ | |
| | | LANE MARKER ID | | ○ | ○ |
| | | LANE MARKER CLASSIFICATION | BROKEN LINE, SOLID LINE, ... | ○ | |
| | | LANE MARKER CENTER LINE | | ○ | |
| | | LANE WIDTH | | ○ | |
| | | RELIABILITY | | ○ | |
| | ADDITIONAL PAINT | PAINT ID | | ○ | ○ |
| | | RELATIVE POSITION | | ○ | ○ |
| | | CLASSIFICATION | STOP LINE, NO ENTRY, ... | ○ | ○ |
| | | REGION DISPLAY | | ○ | |
| | | RELIABILITY | | ○ | |

CONGESTED TRAVELING

NORMAL TRAVELING

VEHICLE PERIPHERY INFORMATION MANAGEMENT DEVICE

CROSS REFERENCE TO RELATED APPLICATIONS

This application is a continuation of U.S. patent application Ser. No. 15/576,956, filed Nov. 27, 2017, which is a National Stage of International Application No. PCT/JP2016/071198, filed Jul. 20, 2016, which claims priority from Japanese Patent Application No. 2015-151449, filed Jul. 31, 2015, the disclosure of which are expressly incorporated by reference herein.

TECHNICAL FIELD

The present invention relates to a vehicle periphery information management device that acquires and manages information on the periphery of a vehicle and provides the information externally.

BACKGROUND ART

Recently, for automatic drive control regarded as important, a plurality of information acquisition devices is required to be mounted on a vehicle in order to secure the entire circumference of the vehicle. Information acquired from the information acquisition devices that have been mounted, widely covers, for example, detected information in an external environment recognition sensor, map information, and vehicle-to-vehicle communication information, so that the amount of information handled in vehicle control increases. Therefore, the load on an in-vehicle network and the processing load of the control are predicted to increase, and thus a device capable of effectively managing the information and providing the information, is required.

As an exemplary system that reduces the load on the in-vehicle network, for example, PTL 1 discloses that a plurality of in-vehicle networks is provided with respective unification ECUs and the unification ECUs each select and transmit necessary information for the other networks from information that has been received, so that the amount of data is optimized. In PTL 1, the networks include a vehicle motion system managing, for example, brakes, steering, and ACC control, a power train system managing, for example, an engine and a transmission, and an electrical power system managing, for example, a battery and an alternator, so that the information on the vehicle is effectively received and transmitted between the systems.

CITATION LIST

Patent Literature

PTL 1: JP 2004-136816 A

SUMMARY OF INVENTION

Technical Problem

Object recognition information to be acquired increases in a travel situation, for example, in a case where a vehicle periphery environment is congested. Therefore, as described above, since the plurality of information acquisition devices is mounted for the automatic drive control, the amount of data provided from the information acquisition devices increases in proportion to, for example, object information and road sign information that have been recognized. In PTL 1, it is not assumed that the amount of information increases in accordance with a travel situation, and the amount of data to be transmitted increases as the number of objects or road signs to be recognized increases. Therefore, there is a problem that the load on a network and the processing load on the information acquisition side, increase.

An object of the present invention is to provide a vehicle periphery information management device capable of inhibiting the load of a network and the processing load on the acquisition side.

Solution to Problem

In order to solve the problem, the vehicle periphery information management device according to the present invention includes: for example, a data integration unit configured to integrate vehicle periphery environment information that has been acquired; and a filter unit configured to filter data integrated by the data integration unit. The filter unit performs processing of removing periphery environment information data present in a region at more than a predetermined distance from a vehicle, from the data that has been integrated.

Advantageous Effects of Invention

According to the present invention, the vehicle periphery information management device that inhibits the load of the network and the processing load on the acquisition side, can be provided.

BRIEF DESCRIPTION OF DRAWINGS

FIG. 14 is a table of an exemplary periphery-information-based filter cycle list.

FIG. 15 is a table of an exemplary periphery-information-based data-to-be-filtered list.

DESCRIPTION OF EMBODIMENTS

An embodiment of the present invention will be described below with reference to the drawings.

First Embodiment

Figure 1:
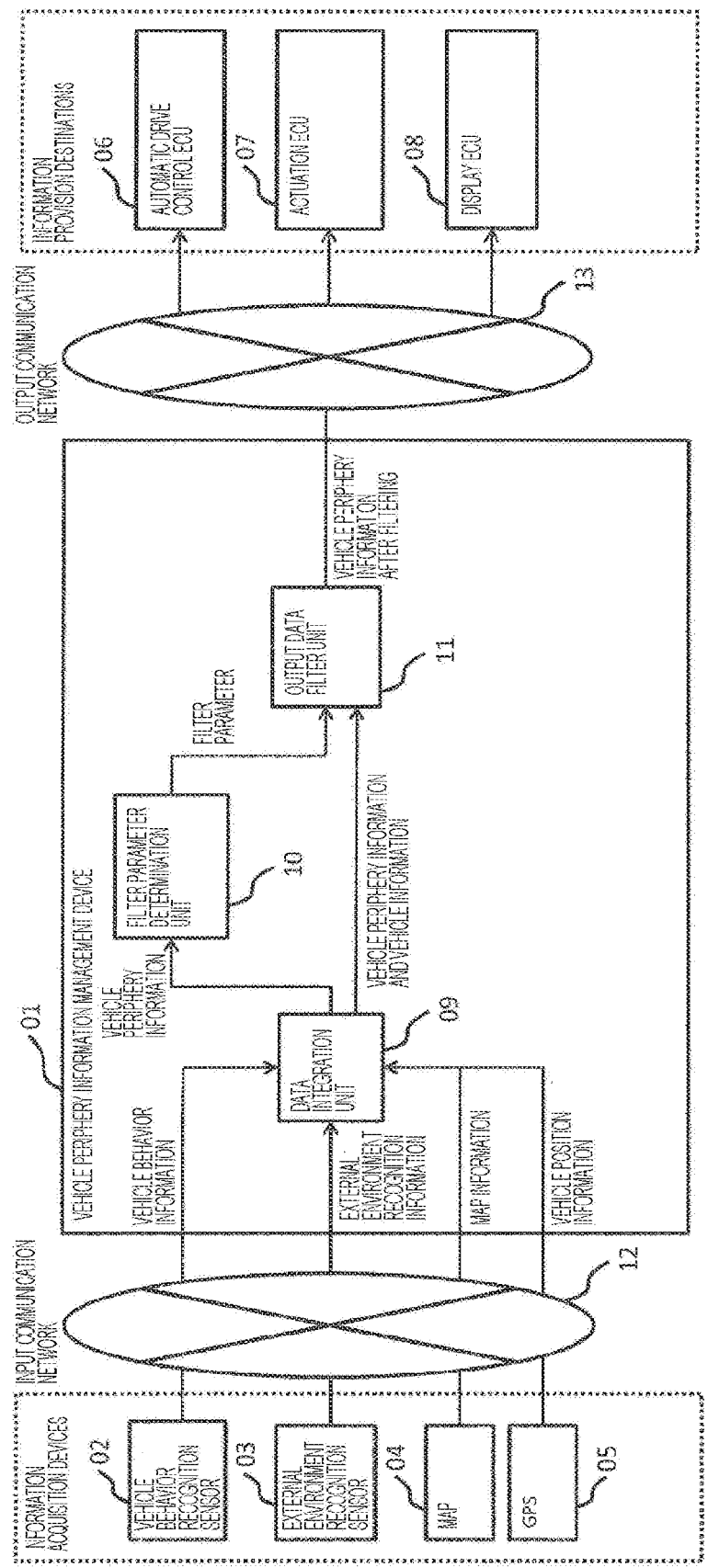
FIG. 1 is an exemplary configuration of an in-vehicle system with a vehicle periphery information management device according to the present invention.

FIG. 1 illustrates the configuration of a vehicle periphery information management device 01, the internal functions thereof, information acquisition devices, and information provision destinations, in a vehicle. The vehicle periphery information management device 01 receives, through an input communication network 12, information indicating the behavior of the vehicle, acquired from a vehicle behavior recognition sensor 02, information on, for example, an object/obstruction and a road sign in an external environment, acquired from an external environment recognition sensor 03, information on, for example, a road shape and a road sign, acquired from a map 04, and vehicle position information acquired from GPS 05, included in the information acquisition devices, so as to perform management in an unificatory manner. The information managed by the vehicle periphery information management device 01, is narrowed down, in data, to minimum information necessary for automatic drive control ECU 06, an actuation ECU 07, and a display ECU 08, included in the information provision destinations, each to perform the corresponding processing, so that the minimum information is transmitted through an output communication network 13.

The vehicle behavior recognition sensor 02 includes, for example, a gyroscope sensor, a wheel speed sensor, a steering angle sensor, and an acceleration sensor, mounted on the vehicle, and a yaw rate, wheel speed, a steering angle, and acceleration, indicating the behavior of the vehicle, can be acquired by the respective sensors.

The external environment recognition sensor 03 includes sensors, such as a camera and radar, and can acquire the relative position and state of an object, an obstruction, or a road sign on the periphery of the vehicle.

Figure 2:
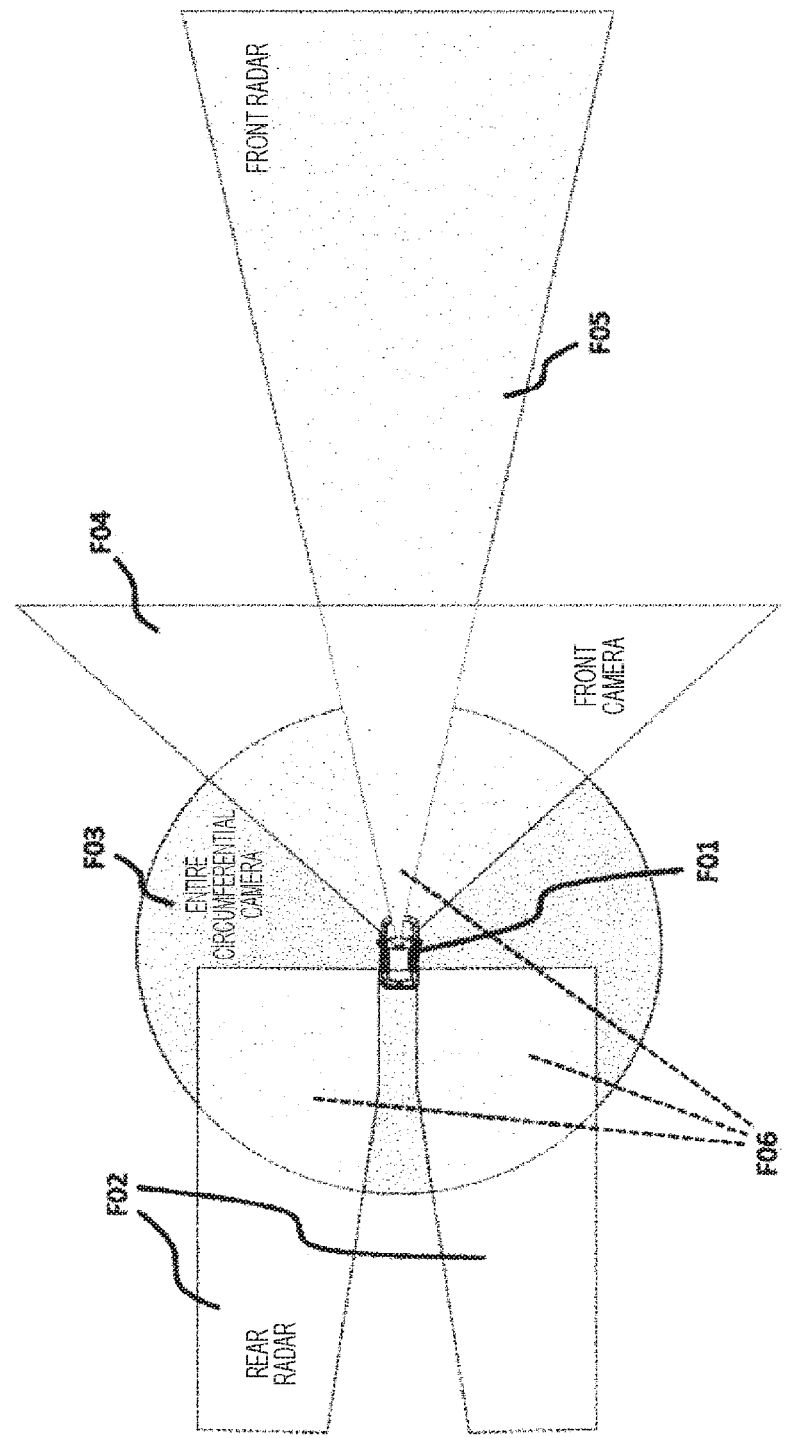
FIG. 2 is a diagram of an exemplary recognition range in an external environment according to the present invention.

As illustrated in FIG. 2, the vehicle F01 is equipped with rear radar F02, an entire circumferential camera F03, a front camera F04, and front radar F05, and includes a detection system capable of detecting information on the entire circumference.

The amount of acquirable information increases as the number of sensors included in the external environment recognition sensor 03 to be mounted increases, so that a reduction effect in data to be transmitted to the network, improves. However, the external environment recognition sensor is not necessarily mounted over the entire circumference. For example, in the configuration of the single front camera F04, the amount of acquirable data increases as the number of objects to be recognized increases. Thus, a travelable region only ahead is determined so that the amount of data to be transmitted to the network can be reduced. Vehicle-to-vehicle communication and road-to-vehicle communication may be also included in the configuration in addition to the external environment recognition sensor 03. In the vehicle-to-vehicle communication, for example, a yaw rate, a steering angle, speed, acceleration, a brake lamp state, and an indicator state, indicating the behavior of a different vehicle, can be wirelessly acquired. In the road-to-vehicle communication, the position and state of a road sign, a signal, or a different vehicle that has passed by, can be wirelessly acquired through a roadside device provided on a road.

The map 04 distributes road information in a range of several kilometers on the periphery of the vehicle. Examples of the road information to be distributed, include speed limit information, road information on the curvature of a road, the gradient of the road, the width of the road, the number of traffic lanes, the position of a branch, the position of merging, and the position of a tollgate.

The GPS 05 represents a GPS receiver that receives a signal from a satellite in the sky, and can acquire the position of the vehicle. Besides, for example, the orientation, the speed, the altitude of the vehicle can be acquired as additional information.

The input communication network 12 and the output communication network 13 each receive and transmit the information through, for example, a controller area network (CAN) being a network typically used in an in-vehicle system, serial communication between CPUs, Ethernet (registered trademark) to be predicted to spread in the future, or wireless communication.

The automatic drive control ECU 06 has a function in which the steering, the brake, and the accelerator of the vehicle are automatically controlled to cause the vehicle to reach the position of a destination. The automatic drive control may be fully automatic to require no operations of a driver or may be semiautomatic to automatically control a part of the operations.

The actuation ECU 07 controls the travel stability of the vehicle to be retained, similarly to traction control or an anti-lock braking system.

The display ECU 08 includes an ECU for displaying information on the periphery of the vehicle, onto, for example, a navigation system or a meter panel. According to the present invention, the three ECUs of the automatic drive control ECU 06, the actuation ECU 07, and the display ECU 08 have been exemplified for a user of the information in the vehicle periphery information management device 01, but may be varied in accordance with a utilization purpose or the configuration of the vehicle.

The vehicle periphery information management device 01 includes a data integration unit (hereinafter, also referred to as a data acquisition unit) 09 and a data selection unit 14. The data selection unit 14 includes a filter parameter determination unit 10 and an output data filter unit 11. The filter parameter determination unit 10, the output data unit 11, and the data integration unit 09 acquire vehicle behavior information, external environment recognition information, map information, and vehicle position information acquired from the vehicle behavior recognition sensor 02, the external environment recognition sensor 03, the map 04, and the GPS 05, respectively, through the input communication network 12. Since acquiring the information from the various information acquisition devices, the data integration unit 09 performs integration into vehicle information and vehicle periphery information, in consideration of the characteristics of each of the information acquisition devices. The data integration unit 09 acts as preprocessing for performing the filter parameter determination unit 10 and the output data filter unit 11, and is a constituent element based on the premise that the consistency of data from the plurality of information acquisition devices operating in asynchronization is ensured and the output data filter unit performs processing of reducing the amount of data. The filter parameter determination unit 10 calculates a parameter regarding how filtering is performed to the vehicle periphery information that has been integrated and how data to be transmitted is reduced. The output data filter unit 11 filters the vehicle periphery information, on the basis of the filter parameter calculated by the filter parameter determination unit 10, so as to transmit the vehicle periphery information including the data to be transmitted, reduced, after the filter, to the output communication network 13.

Figure 3:
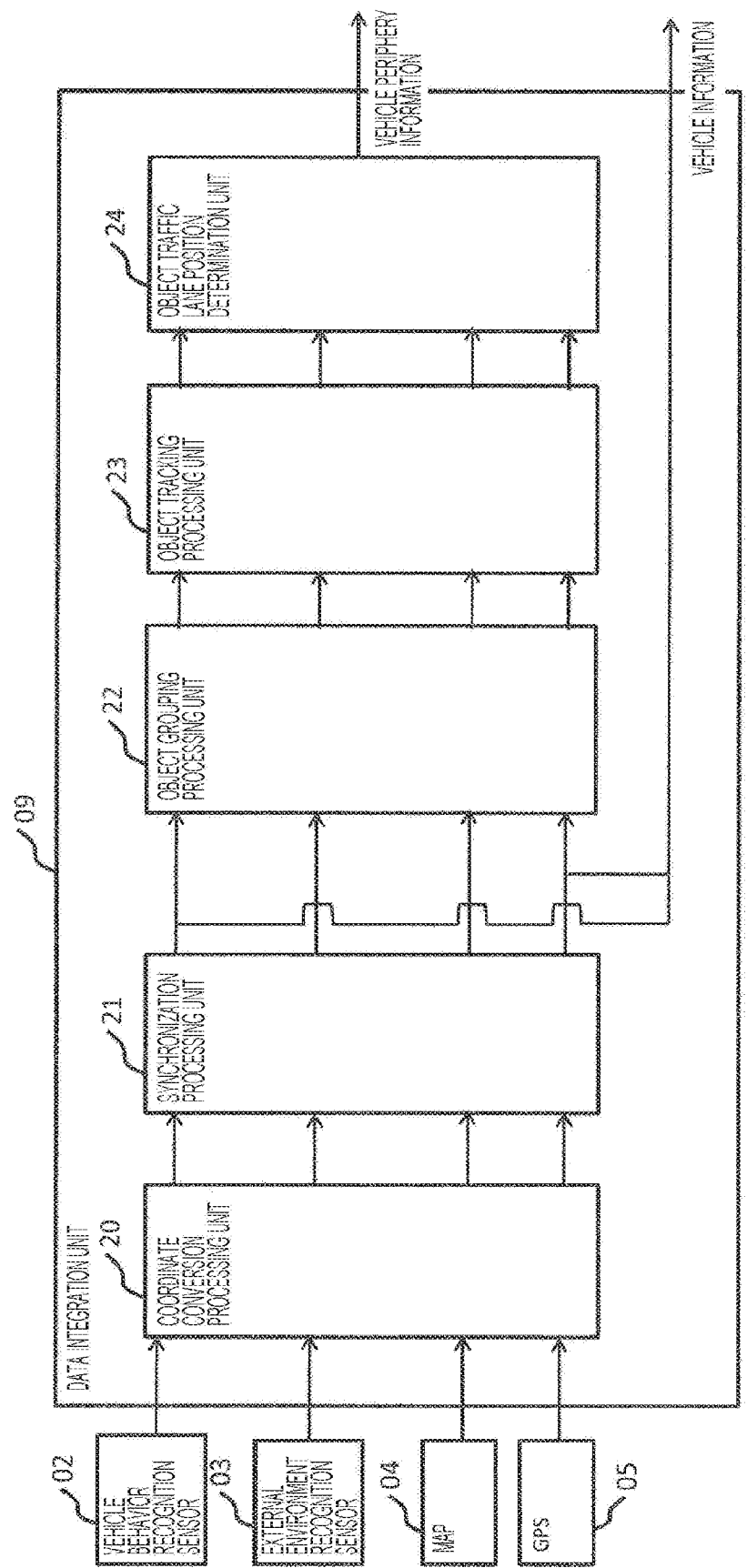
FIG. 3 is a diagram of an exemplary processing block of a data integration unit according to the present invention.

FIG. 3 illustrates an exemplary processing block of the data integration unit 09.

The data integration unit 09 includes a coordinate conversion processing unit 20, a synchronization processing unit 21, an object grouping processing unit 22, an object tracking processing unit 23, and an object traffic lane position determination unit 24. As inputs to the data integration unit 09, the respective pieces of information from the vehicle behavior recognition sensor 02, the external environment recognition sensor 03, the map 04, and the GPS 05, are handled. The coordinate conversion processing unit 20 and the synchronization processing unit 21 are required to generate the vehicle information and the vehicle periphery information ensuring the consistency of the respective pieces of information input from the plurality of information acquisition devices. The object grouping processing unit 22 and the object tracking processing unit 23 are required to cause information on respective objects acquired from the plurality of information acquisition devices, to be consistent information bearing comparison with the real world. The object traffic lane position determination unit 24 is required to calculate the position of an object ensuring the consistency in the objects and traffic lane information from the map.

For the inputs to be received by the data integration unit 09, it is considered that respective coordinate systems handled by the information acquisition devices are different from each other. For example, for the wheel speed sensor being one sensor in the vehicle behavior recognition sensor 02, a coordinate system to be handled is predicted being a Cartesian coordinate system centering on the position of each of the four wheels. For the millimeter-wave radar for front collision avoidance, being one sensor in the external environment recognition sensor 03, a coordinate system to be handled is predicted being a Cartesian coordinate system centering on the position of the head of the vehicle, the Cartesian coordinate system facing in the travel direction of the vehicle. It is predicted that a geodetic coordinate system is used for the coordinate system handled by the map 04 and a position on the earth is indicated in latitude and longitude. In order to absorb the difference between the coordinate systems, the coordinate conversion processing 20 performs conversion into one coordinate system being representative, and the information that has been converted is handled in the subsequent processing. For example, a coordinate system including a Cartesian coordinate system having the center of the vehicle as a criterion, may be provided as a representative. The conversion into the one coordinate system being representative, requires no coordinate conversion processing to be performed in accordance with the characteristics of the information acquisition devices every time the information in the external environment recognition sensor 03 is linked with the information in the map 04 in the subsequent processing.

Next, the synchronization processing unit 21 corrects and synchronizes the acquisition time lags between respective pieces of data acquired from the information acquisition devices. In the in-vehicle system, each of the information acquisition devices operates asynchronously and has a difference, for example, in the transmission cycle of data. Therefore, for example, when the position information on an object acquired from each of the information acquisition devices, is used remaining intact, the relative position gaps occur between the respective objects detected by the information acquisition devices, and thus a difference occurs in the relative positional relationship between the information in the vehicle periphery information management device and the object in the real world. As a result, the risk of collision increases to cause danger in automatic driving that determines and controls the positional relationship between a plurality of vehicles.

In a case where the respective objects detected by the information acquisition devices are the same in the real world, the object grouping processing unit 22 determines the objects as identical. When the number of sensors in the external environment recognition sensor 03 mounted on the vehicle increases, the individual sensors in the external environment recognition sensor 03 may detect the same region. For example, the rear radar F02, the entire circumferential camera F03, the front camera F04, and the front radar F05 detect respective objects in overlapped regions F06 in an exemplary external environment recognition range of FIG. 2. For this configuration, if the vehicle periphery information management device transmits the objects as different to the automatic drive control ECU 06 regardless of the objects identical in the real world, predicting a move and performing control are originally at least required to one object, but the moves of the plurality of objects must be predicted so that unnecessary processing occurs. Therefore, if respective objects detected by different sensors in the external environment recognition sensor are identical, there is a need to perform grouping to the objects as identical and to transmit the objects as identical to the control.

The object tracking processing unit 23 acts as processing of continuing to recognize an object as the same even when the object passes through the respective recognition range boundaries of the information acquisition devices. With a description having the exemplary external environment recognition range of FIG. 2, in a situation in which a different vehicle overtakes from the right rear of the vehicle F01, the different vehicle is first detected at the right rear of the rear radar F02, and then the recognition is switched from the right rear of the rear radar F02 to the right side of the entire circumferential camera F03 as the different vehicle moves to the right side of the vehicle. In this case, in a case where viewed from the rear radar F02 that has performed the first detection, when the different vehicle deviates from the recognition range of the right rear of the rear radar F02, information on the different vehicle in the rear radar F02 is interrupted. Instead, since the different vehicle moves to the right side of the entire circumferential camera F03, the entire circumferential camera F03 outputs the interrupted information on the different vehicle in the rear radar F02. In this manner, with even information on an object interrupted when viewed from each of the information acquisition devices, the object tracking processing 23 handles the objects as identical. Without the processing, when the vehicle periphery information management device makes a switch to the entire circumferential camera F03 and performs recognition as a different object despite the objects identical in the real world, the object to which attention has been paid, disappears and it looks as if a new object appears, as data. Therefore, the control cannot continue to the objects identical, on the control side, and thus the precision of object behavior prediction degrades and there is a risk that the reliability of the control degrades. According to the present embodiment, when the continuity of data of an object/obstruction is lost, the determination precision of a travelable region calculated from the positional relationship with the object/obstruction, degrades and the data reduction effect may decrease. Therefore, even when detection is performed by different sensors in the external environment recognition sensor, the objects may be regarded as identical in the tracking processing so as to be transmitted to the control.

The object traffic lane position determination unit 24 determines in which traffic lane on the road the object/obstruction detected by each of the information acquisition devices is present. According to the present embodiment, processing of calculating a travelable region per traffic lane, is assumed in the following descriptions, and thus there is a need to calculate in which traffic lane the object/obstruction detected by each of the information acquisition devices is present.

The processing is performed to finally output the vehicle information and the vehicle periphery information. The vehicle information here includes, for example, the vehicle position information, the speed, yaw rate, steering angle, acceleration, indicator information, and brake lamp information of the vehicle. The vehicle periphery information includes, for example, the relative position, relative speed, and travel traffic lane position of another vehicle, a pedestrian, or a two-wheeled vehicle present on the periphery of the vehicle. Road information, sign information, and signal information present on the periphery of the vehicle are also included.

Figure 4:
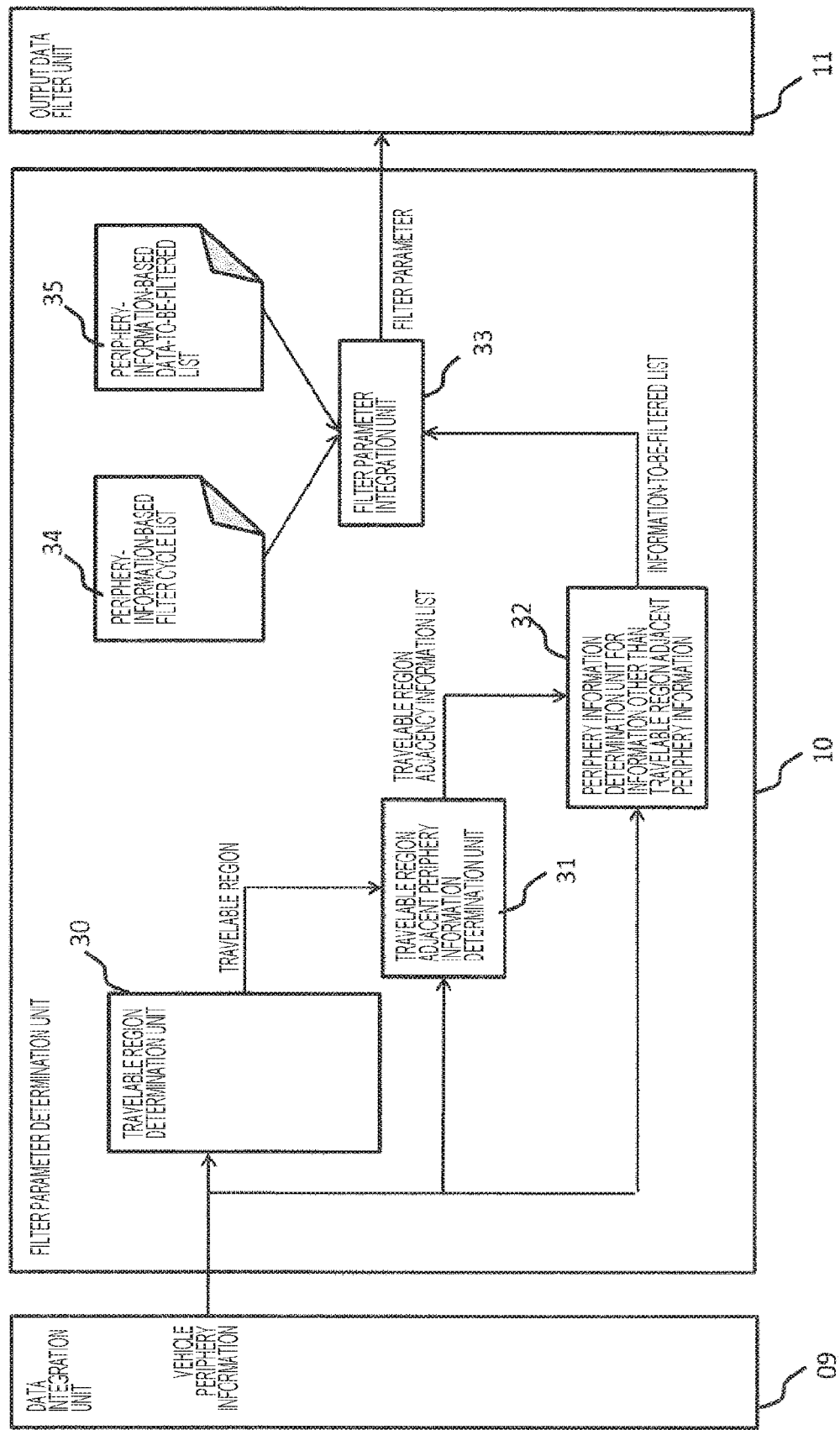
FIG. 4 is a diagram of an exemplary processing block of a filter parameter determination unit according to the present invention.

FIG. 4 illustrates an exemplary processing block of the filter parameter determination unit 10.

The filter parameter determination unit 10 includes a travelable region determination unit 30, a travelable region adjacent periphery information determination unit 31, a periphery information determination unit 32 not for travelable region adjacent periphery information, and a filter parameter integration unit 33. First, the travelable region determination unit 30 calculates a travelable region with, as an input, the vehicle periphery information from the data integration unit 09. The travelable region determination unit 30 has a function of calculating a region in which the vehicle can travel, on the basis of the vehicle periphery information, and determines whether the vehicle can move to the region. According to the present embodiment, for the determination of the movability, the movability is basically determined in a case where an event in which a different object/obstruction obstructs the travel of the vehicle, does not happen in a region to which the vehicle moves. With the travelable region output from the travelable region determination unit 30 and the vehicle periphery information from the data integration unit 09, the travelable region adjacent periphery information determination unit 31 calculates a travelable region adjacency information list. The travelable region adjacency information list includes information listing, for example, objects/obstructions that can immediately enter the travelable region. That is, the information indicates immediately approachability to the vehicle, and has high priority as information in consideration of a safety aspect. With the travelable region adjacency information list output from the travelable region adjacent periphery information determination unit 31 and the vehicle periphery information from the data integration unit 09, the periphery information determination unit 32 not for the travelable region adjacent periphery information calculates an information-to-be-filtered list. The information-to-be-filtered list includes information listing, for example, objects/obstructions and signs that have not been registered in the travelable region adjacency information list but have been recognized by the external environment recognition sensor and the map. That is, the information indicates immediately inapproachability to the vehicle, and has low priority as information in consideration of the safety aspect. With the information-to-be-filtered list output from the periphery information determination unit 32 not for the travelable region adjacent periphery information, a periphery-information-based filter cycle list 34, and a periphery-information-based data-to-be-filtered list 35, the filter parameter integration unit integrates parameters so as to make an output to the output data filter unit. A filter parameter that has been calculated, is used for the filter processing in the output data filter unit 11. The periphery-information-based filter cycle list 34 and the periphery-information-based data-to-be-filtered list 35 may be previously statically determined by a system designer or may be externally received and set as dynamical parameters. For example, in a case where the external reception is performed, a method of collecting respective parameters from the automatic drive control ECU 06, the actuation ECU 07, and the display ECU 08 of FIG. 1, is considered.

Figure 5:
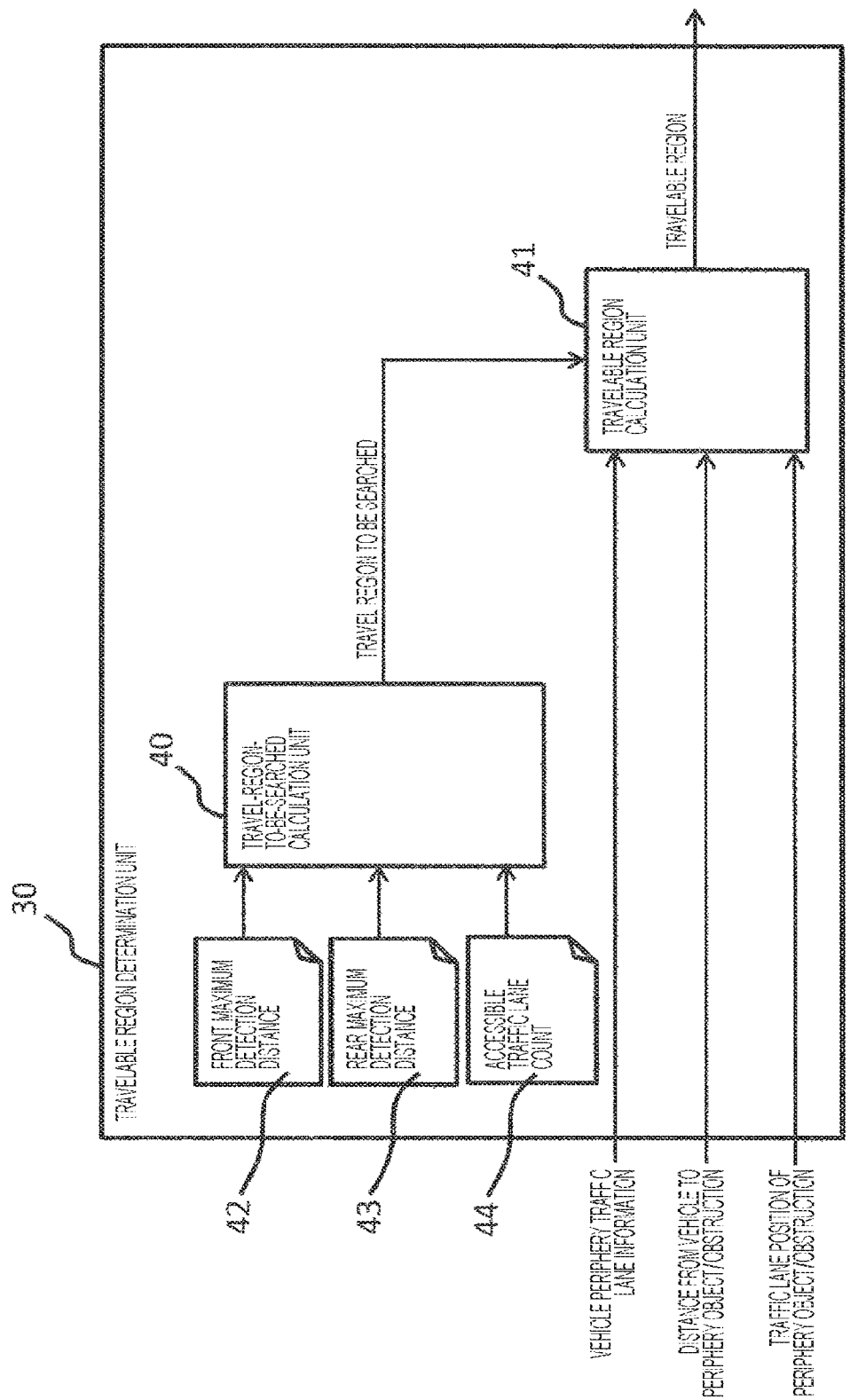
FIG. 5 is a diagram of an exemplary processing block of a travelable region determination unit according to the present invention.

FIG. 5 illustrates an exemplary processing block of the travelable region determination unit 30.

Figure 7:
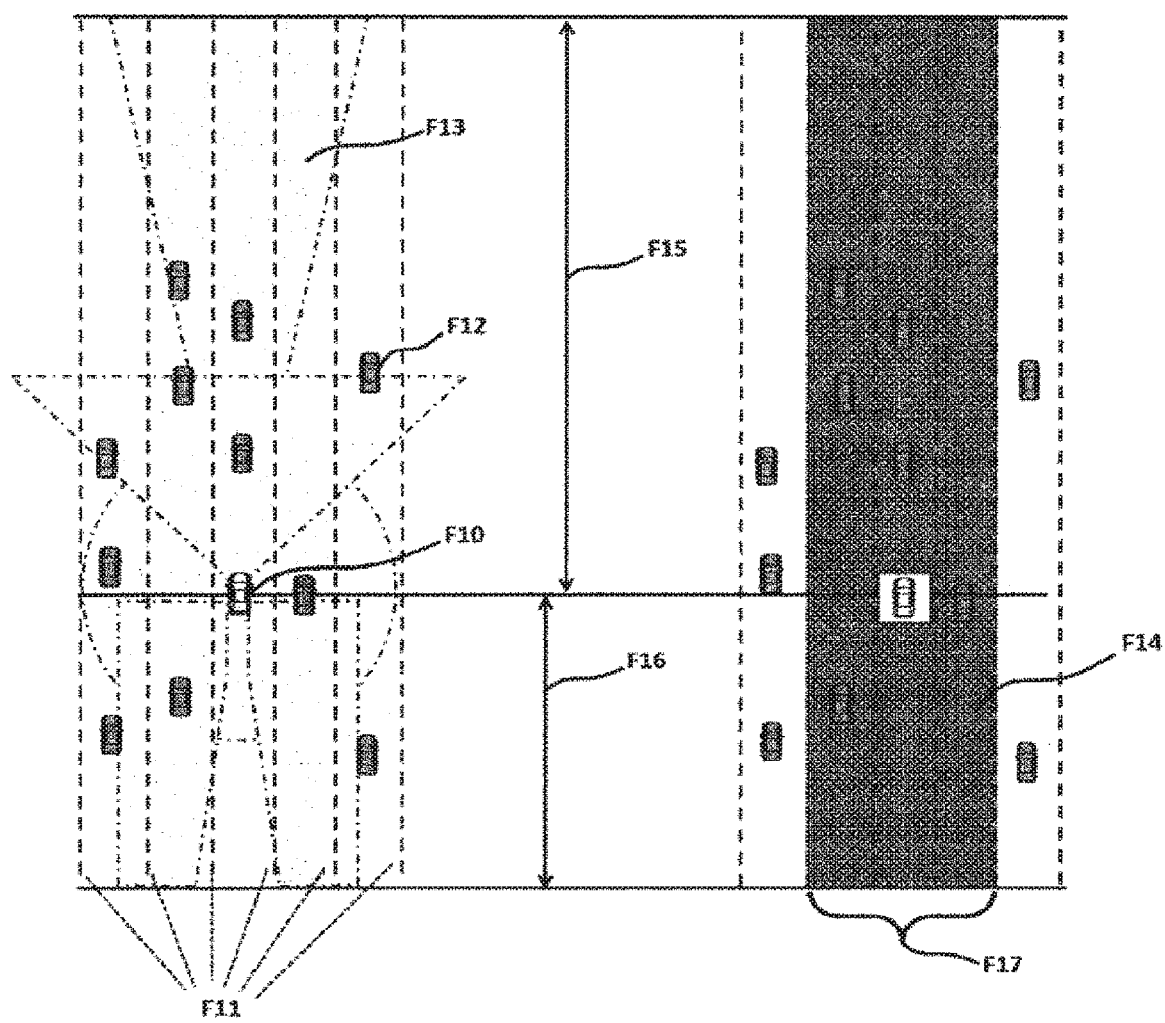
FIG. 7 is a diagram for describing an exemplary travel region to be searched according to the present invention.

The travelable region determination unit 30 includes a travel-region-to-be-searched calculation unit 40 and a travelable region calculation unit 41. The travel-region-to-be-searched calculation unit 40 receives a front maximum detection distance 42, a rear maximum detection distance 43, and an accessible traffic lane count 44 that have been previously set, and then outputs a travel region to be searched to the travelable region calculation unit 41. The travel region to be searched includes a region to be searched of a periphery object/obstruction in calculating the travelable region below, and, in this case, a region detected by the external environment recognition sensor is exemplarily to be searched. Therefore, the front maximum detection distance 42 and the rear maximum detection distance 43 are used as inputs. The accessible traffic lane count 44 is set to a fixed value since the number of traffic lanes to which the vehicle can immediately move, is not so large. The travelable region calculation unit 41 receives the travel region to be searched calculated by the travel-region-to-be-searched calculation unit 40, vehicle periphery traffic lane information, the distance from the vehicle to the periphery object/obstruction, and the traffic lane position of the periphery object/obstruction, so as to output the travelable region. FIG. 7 illustrates a diagram for describing the travel region to be searched. FIG. 7 illustrates the vehicle F10, traffic lanes F11, an object/obstruction F12 (a vehicle not being the vehicle F10) detected by the external environment recognition sensor, on the periphery of the vehicle, an external environment recognition sensor detection region F13, and the travel region to be searched F14. The travel region to be searched F14 is calculated with the front maximum detection distance F15 and the rear maximum detection distance F16 detected in the external environment recognition sensor detection region F13, and the accessible traffic lane count F17 that has been previously set. Here, the accessible traffic lane count F17 exemplarily expresses three traffic lanes of the left traffic lane and the right traffic lane to which the vehicle can immediately move, and the travel traffic lane of the vehicle. With the vehicle F10 centered, the three traffic lanes of the accessible traffic lane count F17 up to the front maximum detection distance F15 are to be searched in the front, and the three traffic lanes of the accessible traffic lane count F17 up to the rear maximum detection distance F16 are to be searched in the rear. In a case where the vehicle is in the right end traffic lane, two traffic lanes of the travel traffic lane of the vehicle and the left traffic lane of the vehicle are required at least to be searched.

Figure 6:
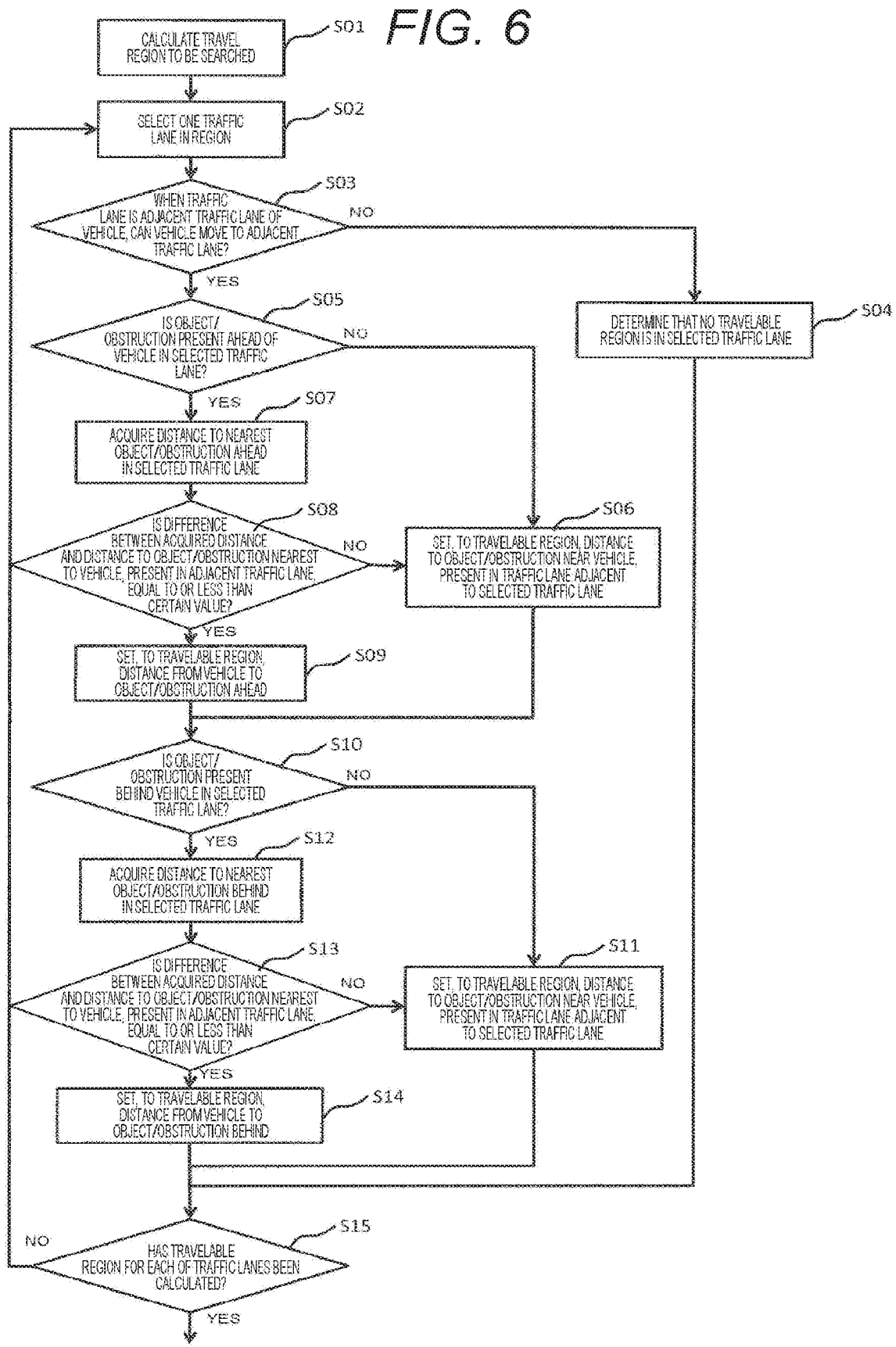
FIG. 6 is a flowchart of travelable region calculation according to the present invention.

FIG. 6 illustrates an exemplary flowchart of the travelable region calculation unit 41.

First, the travel-region-to-be-searched calculation unit 40 illustrated in FIG. 5 calculates the travel region to be searched, at S01.

Next, one traffic lane is selected from the traffic lanes in the travel region to be searched, at S02. In the example of FIG. 7, the three traffic lanes are provided at a maximum, and thus one traffic lane is selected therefrom and the subsequent set of processing S03 to S15 is performed. The set of processing S03 to S15 is repeated until all the three traffic lanes are processed. The set of processing S03 to S15 includes two pieces of processing, and a set of processing S05 to S09 acts as processing of calculating the travelable region ahead of the vehicle and a set of processing S10 to 14 acts as processing of calculating the travelable region behind the vehicle.

Figure 8B:
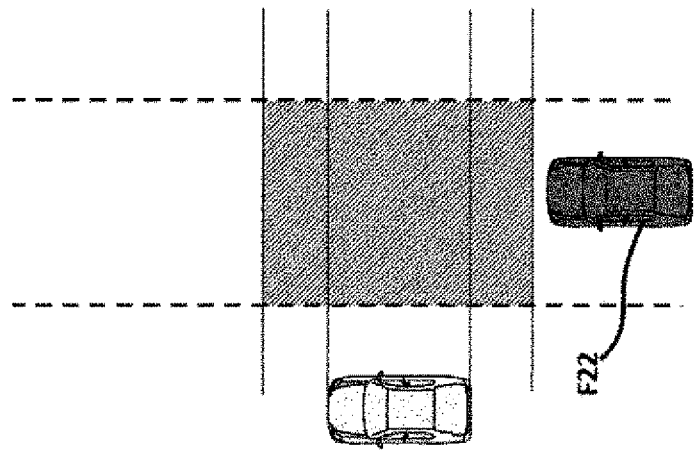
FIGS. 8A and 8B are diagrams describing exemplary adjacent traffic lane movability determination according to the present invention.
Figure 8A:
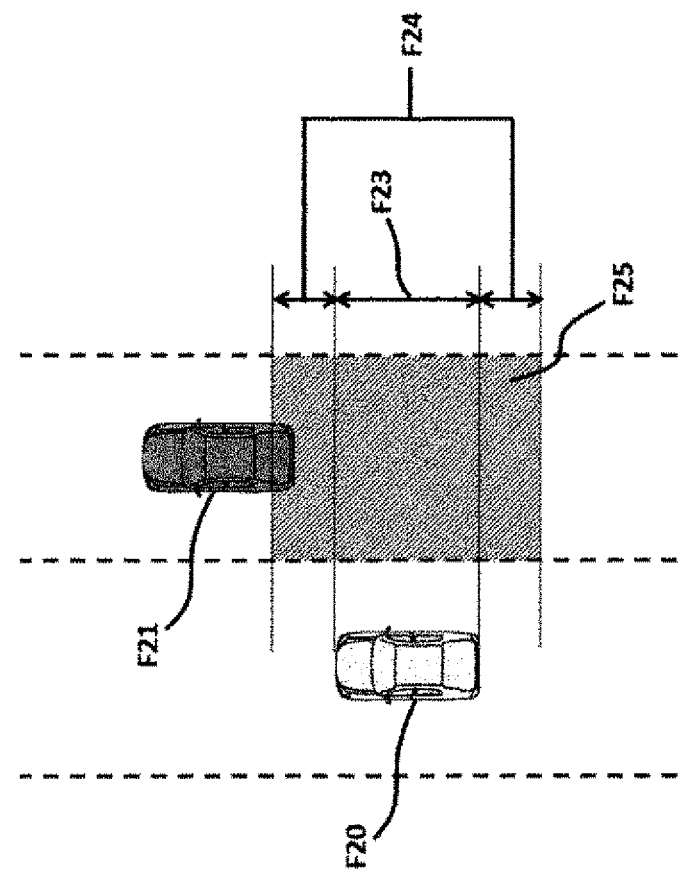

Next, in a case where the traffic lane that has been selected is an adjacent traffic lane to the vehicle (the left traffic lane or the right traffic lane), it is determined whether the vehicle can move to the adjacent traffic lane, at S03. The determination of whether the vehicle can move to the adjacent traffic lane, will be described with exemplary adjacent traffic lane movability determination of FIG. 8. For the movability of the vehicle F20 of FIG. 8(a) to the right traffic lane, it is determined whether a different vehicle F21 belongs to a movability region F25 even in a small degree, and non-movability is determined in a case where belonging to the movability region F25 even in the small degree. For FIG. 8(a), the different vehicle F21 belongs to the movability region F25 so that non-movability is determined. For FIG. 8(b), a different vehicle F22 does not belong to the movability region F25 so that movability is determined. The longitudinal width of the movability region F25 is expressed as a region including a front/rear margin distance F24 added to the entire vehicle length F23 of the vehicle F20 illustrated in FIG. 8(a). The width of the traffic lane is used for the lateral width of the movability region F25. Even when a region in size the same as the entire vehicle length F23 is vacant, a move cannot be made in practice and there is a need to keep a degree of inter-vehicular distance. Thus, the front and rear margin distance F24 is defined in the adjacency movability determination. If the vehicle cannot move to the adjacent traffic lane, it is determined that no travelable region is in the traffic lane that has been selected, at S04. Exemplarily with a travelable region scene 1 of FIG. 9, since a different vehicle is present in the right traffic lane of the vehicle, a traffic lane F30 in the travel region to be searched F14 is excluded from the travelable region, at S04. In this manner, the reason why the traffic lane to which the vehicle cannot immediately move is excluded from the travelable region, is that a region to which no move can be made is to be included in the travelable region if the traffic lane to which the vehicle cannot immediately move is included in the travelable region, and the reduction effect of the amount of data to be transmitted decreases.

Figure 11:
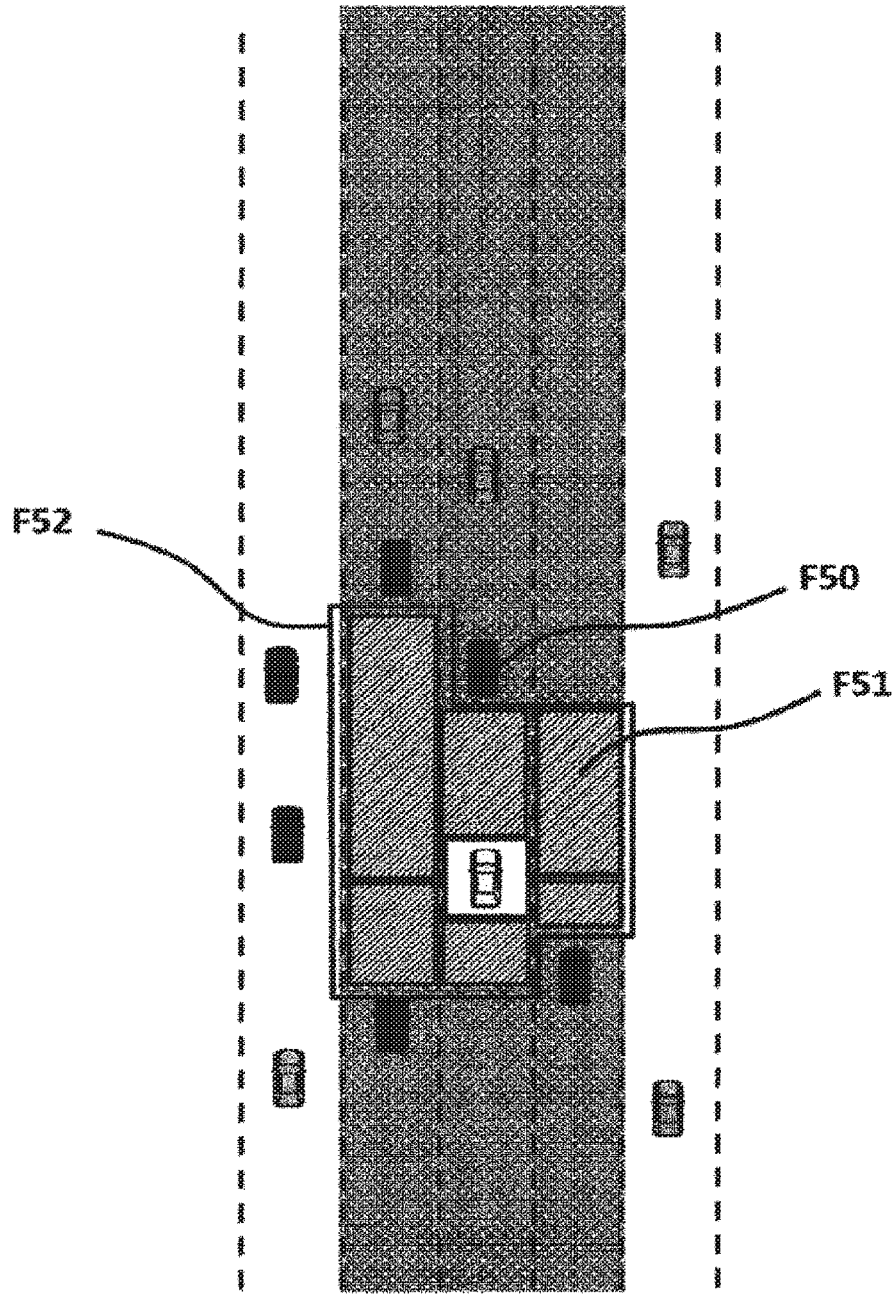
FIG. 11 is a diagram for describing a travelable region scene 2 according to the present invention.

Next, in a case where the vehicle can move to the adjacent traffic lane, it is determined whether a different object/obstruction is present ahead in the traffic lane that has been selected, at S05. In a case where no object/obstruction is present, a distance to a different object/obstruction present in the adjacent traffic lane to the traffic lane that has been selected, is included in the travelable region, at S06. Exemplarily with a travelable region scene 2 of FIG. 11, since no vehicle is present ahead in the right traffic lane of the vehicle, the travelable region includes the front maximum detection distance of the right traffic lane, with simple consideration. Note that, with this arrangement, the region to which no immediate move can be made, is also included in the travelable region and the reduction effect of the amount of data to be transmitted decreases. Thus, according to the present embodiment, in a case where no different object/obstruction is present ahead in the right traffic lane that has been selected, the travelable region F51 is set with a distance from a different object/obstruction F50 present in the left adjacent traffic lane (a different object/obstruction ahead of the vehicle) to the vehicle. In a case where a different object/obstruction is present ahead, a distance to the nearest object/obstruction ahead in the traffic lane that has been selected, is acquired at S07.

Figure 13:
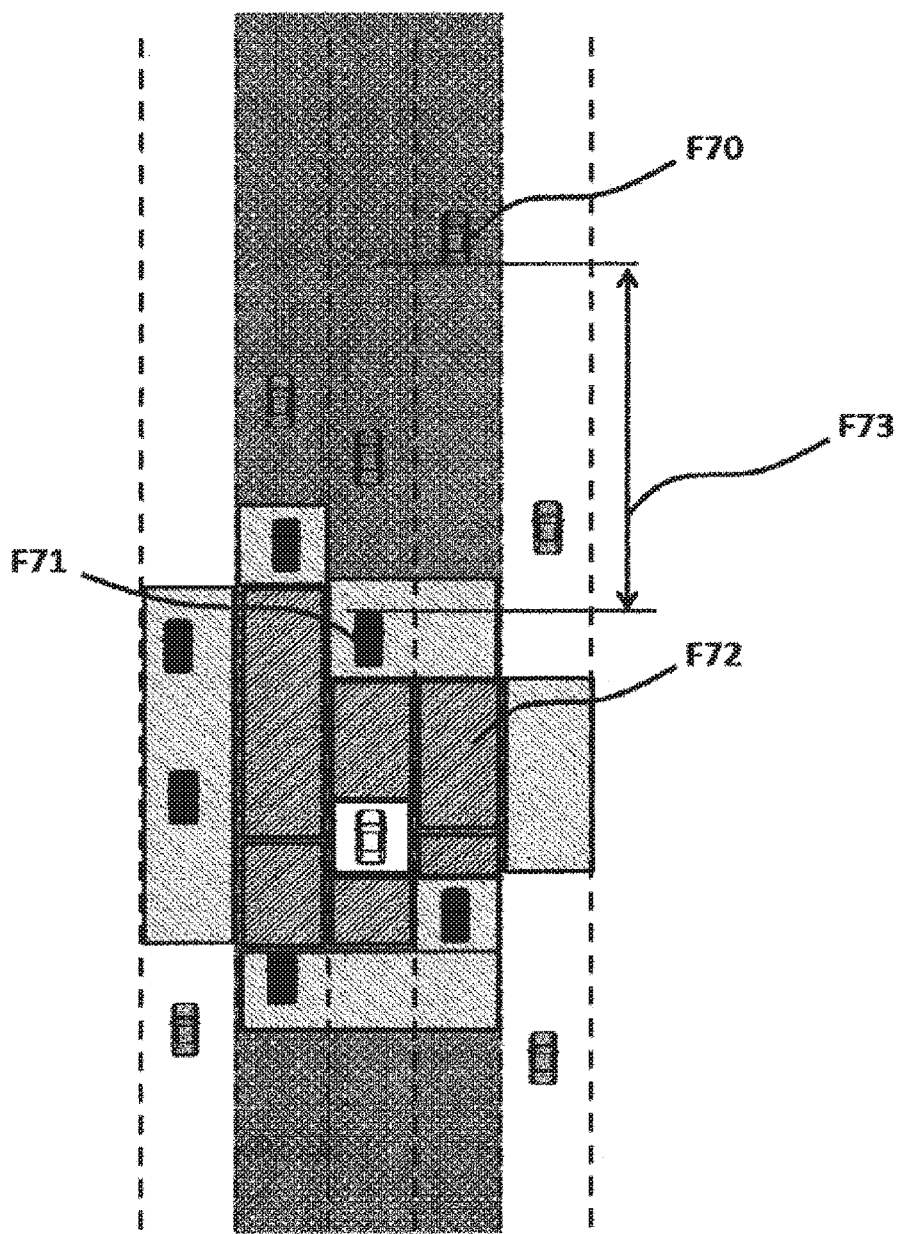
FIG. 13 is a diagram for describing a travelable region adjacency information scene 3 according to the present invention.

Next, it is determined whether the difference between the distance acquired at S07 and the distance to the different object/obstruction nearest to the vehicle, present in the adjacent traffic lane, is a certain value or less, at S08. In a case where the difference is larger than the certain value, the distance to the different object/obstruction present in the adjacent traffic lane to the traffic lane selected at S06, is included in the travelable region. As exemplarily illustrated in a travelable region adjacency information scene 3 of FIG. 13, in a case where the difference F73 in distance between a different object/obstruction F70 present ahead in the right traffic lane of the vehicle and a different object/obstruction F71 present ahead of the vehicle, is large, the travelable region in the right traffic lane of the vehicle practically includes a travelable region to which no immediate move can be made. Thus, in this case, the travelable region F72 is set with the distance to the different object/obstruction F71 ahead of the vehicle. In a case where the distance F73 is the certain value or less, the distance from the vehicle to the different object/obstruction ahead, is included in the travelable region at S09. Exemplarily with the left traffic lane of the vehicle in the travelable region scene 1 of FIG. 9, since the distance F34 between the object/obstruction ahead of the vehicle and an object/obstruction ahead in the left traffic lane, is short, a distance to the nearest object/obstruction ahead in the left traffic lane, is set to the travelable region in the left traffic lane F31. Exemplarily with the travel traffic lane of the vehicle, a distance to the nearest object/obstruction ahead, is set to the travelable region in the travel traffic lane F32.

A set of processing from S05 to S09 above is performed to the front direction of the vehicle, whereas a set of processing from S10 to S14 is performed to the rear direction of the vehicle and it is determined whether an object/obstruction is present behind the vehicle in the traffic lane that has been selected, at S10. In a case where no object/obstruction is present, a distance to an object/obstruction present in the adjacent traffic lane to the traffic lane that has been selected, is included in the travelable region at S11. Ina case where an object/obstruction is present, a distance to the nearest different object/obstruction behind the vehicle in the traffic lane that has been selected, is acquired at S12. Next, it is determined whether the difference between the distance that has been acquired and the distance to the nearest different object/obstruction to the vehicle, present in the adjacent traffic lane, is a certain value or less, at S13. In a case where the difference is larger than the certain value, the travelable region is set at S11. In a case where the difference is the certain value or less, the distance to the different object/obstruction behind the vehicle, is included in the travelable region at S14.

Next, it is determined whether the travelable region for each of the traffic lanes has been calculated with a set of processing S02 to S14 above, at S15, and if the calculation has not been completed, the processing is repeated from S02. If the calculation has been completed, the processing of calculating the travelable region finishes.

Figure 9:
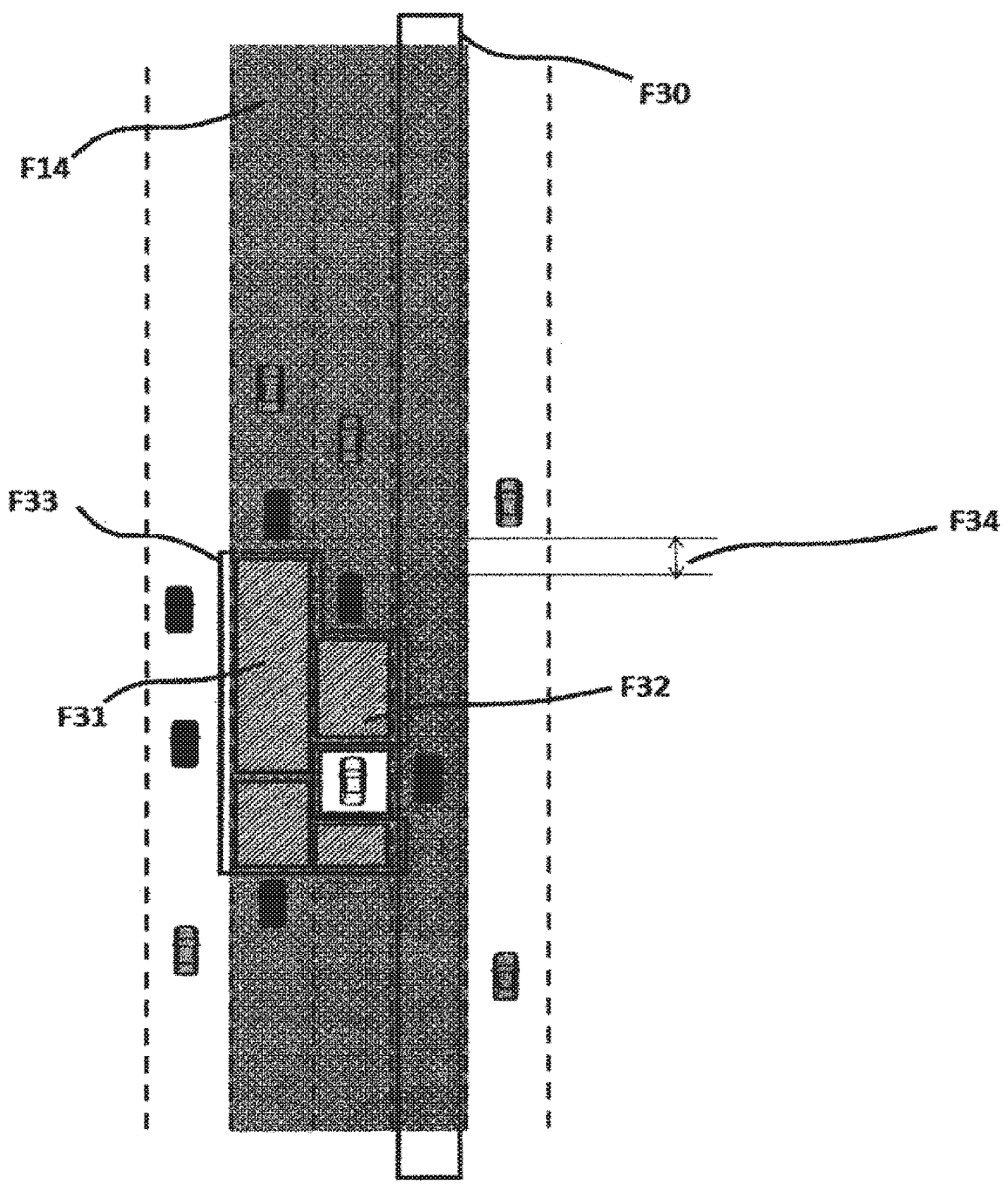
FIG. 9 is a diagram for describing a travelable region scene 1 according to the present invention.

As a result of the processing in the flowchart of the travelable region calculation illustrated in FIG. 6, the travelable region F33 is calculated exemplarily with the travelable region scene 1 of FIG. 9. The travelable region F52 is calculated exemplarily with the travelable region scene 2 of FIG. 11.

The travelable region adjacent periphery information determination unit 31 of FIG. 4, will be described.

Figure 12:
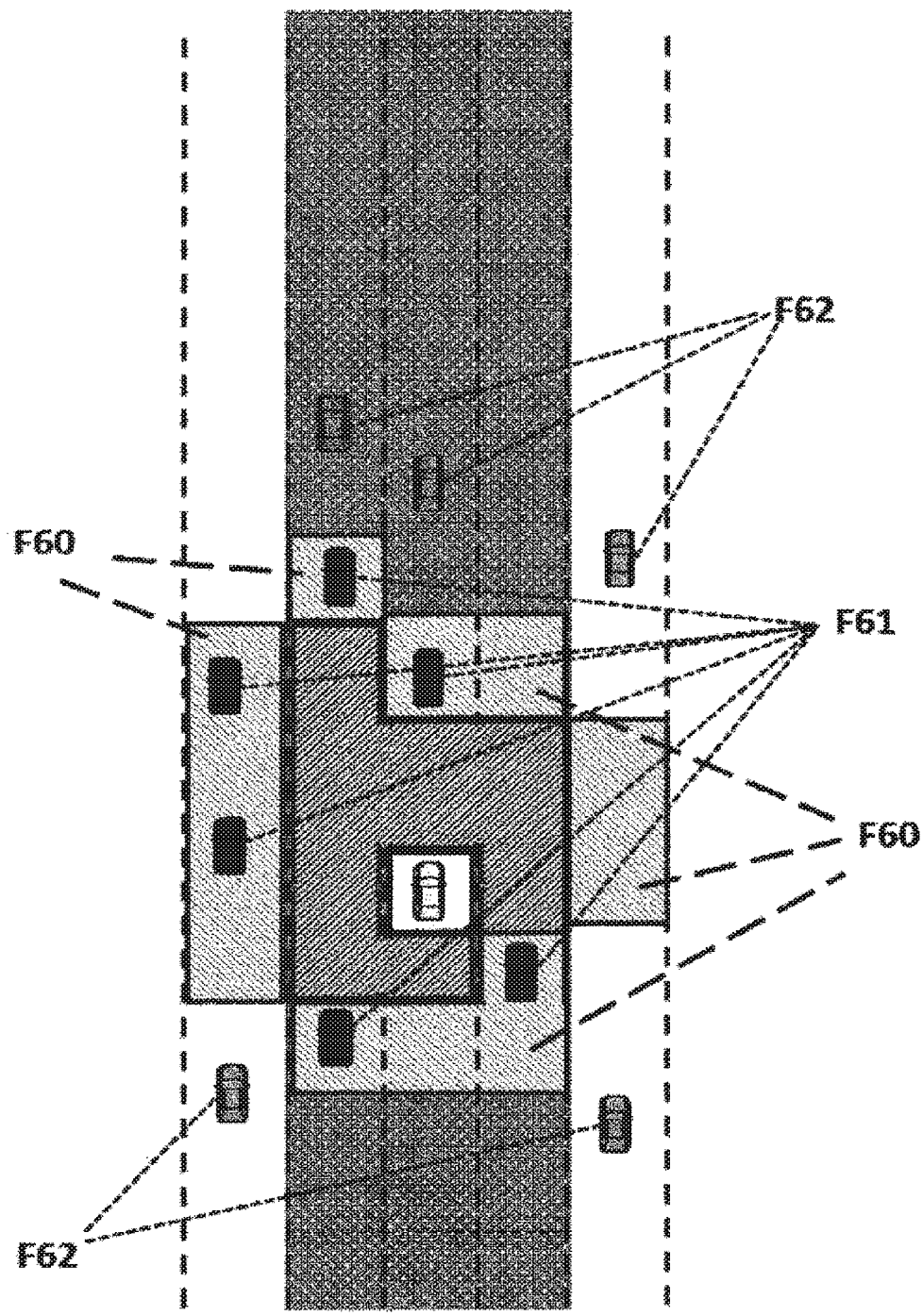
FIG. 12 is a diagram for describing a travelable region adjacency information scene 2 according to the present invention.

When the travelable region scene 1 of FIG. 9 is applied to the travelable region determination unit 30 of FIG. 4, the travelable region F33 is acquired. The travelable region adjacent periphery information indicates a region adjacent to the travelable region F33 of FIG. 9, and indicates a region F40 in the travelable region adjacency information scene 1 of FIG. 10. The minimum longitudinal width F43 of the travelable region adjacent region, may use the entire length of a different object/obstruction F41 or may be varied in accordance with the vehicle speed of the different object/obstruction F41. The minimum lateral width F44 thereof may use the entire width of the different object/obstruction F41 or may use the width of a traffic lane acquired from the map or a camera. Different objects/obstructions F41 positioned on the travelable region adjacent region F40, are defined as the travelable region adjacent periphery information. The travelable region adjacent periphery information determination unit 31 outputs the travelable region adjacency information list listing the plurality of different objects/obstructions. The travelable region adjacent region in the travelable region adjacency information scene 2 of FIG. 12 is indicated with F60, to the travelable region F52 illustrated in the travelable region scene 2 of FIG. 11. Similarly to the example of FIG. 10, different objects/obstructions F61 positioned on the region F60, are included in the travelable region adjacent periphery information, and the plurality of different objects/obstructions are listed so as to be output to the periphery information determination unit 32 not for the travelable region adjacent periphery information. As described above, since the different objects/obstructions allocated to the travelable region adjacent periphery information, are adjacent to the travelable region of the vehicle, the different objects/obstructions have high possibility of immediately moving to the travelable region of the vehicle. The travelable region adjacent periphery information has high priority as information to be provided, and thus providing detailed information on the position and behavior of each of the objects/obstructions, to the user, is required.

The periphery information determination unit 32 not for the travelable region adjacent periphery information of FIG. 4, will be described.

Figure 10:
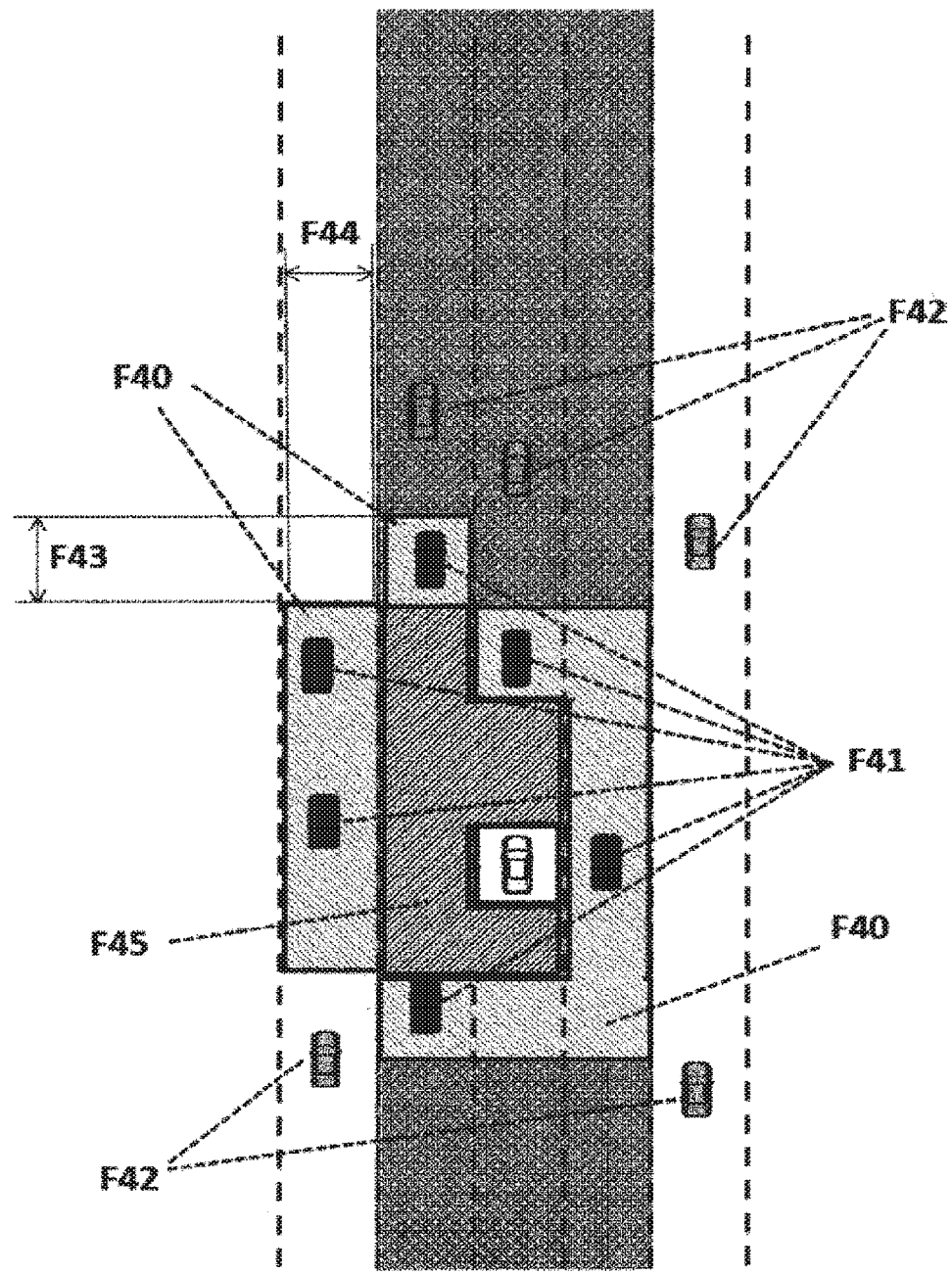
FIG. 10 is a diagram for describing a travelable region adjacency information scene 1 according to the present invention.

The periphery information determination unit 32 not for the travelable region adjacent periphery information, outputs, as the information-to-be-filtered list, different objects/obstructions F42 detected by the external environment recognition sensor, to the filter parameter integration unit 33, except the different objects/obstructions F41 included in the travelable region adjacency information list, illustrated in FIG. 10. Similarly, in FIG. 12, as the information-to-be-filtered list, different objects/obstructions F62 detected by the external environment recognition sensor, are output to the filter parameter integration unit 33, except the different objects/obstructions F61 included in the travelable region adjacency information list. The information-to-be-filtered list that has been selected here, indicates the objects/obstructions that do not immediately move to the travelable region of the vehicle, having low priority, differently from the objects/obstructions having high priority, adjacent to the travelable region. Therefore, it can be predicted that no large influence is exerted on the objects/obstructions registered in the information-to-be-filtered list even when data to be provided to the user is reduced.

A method of calculating a parameter for filtering the information-to-be-filtered list by the filter parameter integration unit 33 of FIG. 4, will be described.

With the information-to-be-filtered list from the periphery information determination unit not for the travelable region adjacent periphery information, the filter parameter integration unit 33 performs processing of selecting parameters to be filtered from the periphery-information-based filter cycle list 34 and the periphery-information-based data-to-be-filtered list 35. The periphery-information-based filter cycle list 34 includes a list for reducing the amount of data by temporal data decimation. The periphery-information-based data-to-be-filtered list 35 includes a list for reducing the amount of data by quantitative data decimation.

First, an exemplary periphery-information-based filter cycle list will be described with FIG. 14. In the periphery-information-based filter cycle list of FIG. 14, vehicle periphery information object classification includes a periphery three-dimensional object and periphery road surface information. The periphery three-dimensional object includes, for example, an object, a signal, a sign, and a road end. Furthermore, the object includes information on, for example, an object ID, a relative position, a relative speed, a width, and a height. The signal includes information on, for example, a signal ID, a classification, a relative position, and a state. In addition, the sign and the road end each include detailed information. The periphery road surface information includes information on, for example, a lane marker and additional paint. Furthermore, the lane marker includes information on, for example, a lane ID, a lane classification, a relative position, and a yaw angle. The additional paint includes, for example, a paint ID, a relative position, and a classification. Respective cycles in which the descriptions are transmitted, are defined in the present list. Here, a transmission cycle in a default and a cycle in filtering, are defined. Basically, the transmission cycle in the default, is set to a value faster than that of the cycle in the filtering, and the transmission cycle in the default is allocated to the information in the travelable region adjacent periphery information list. In contrast, the cycle in the filtering is allocated to the information-to-be-filtered list being an object of which data to be transmitted is desirably reduced, so that the amount of data to be transmitted within a certain period is inhibited. For example, taking the relative position of the object in the periphery three-dimensional object as an example, a default cycle of 60 ms is applied to each of the objects/obstructions F41 of FIG. 10. A filter cycle of 100 ms is applied to each of the objects/obstructions F42. With this arrangement, information can be provided to the user with the amount of data within the certain period, inhibited for the objects/obstructions F42 having low priority in comparison to the objects/obstructions F41 having high priority.

Next, an exemplary periphery-information-based data-to-be-filtered list, will be described with FIG. 15. The periphery-information-based data-to-be-filtered list of FIG. 15 also includes vehicle periphery information object classification similar to that of the periphery-information-based filter cycle list of FIG. 14. Here, descriptions to be transmitted in default and descriptions to be transmitted after filtering, are defined. Basically, the descriptions to be transmitted in the default are set larger in quantity than the descriptions to be transmitted after the filtering, and the descriptions to be transmitted in the default are allocated to the information in the travelable region adjacent periphery information list. In contrast, the descriptions to be transmitted after the filtering are allocated to the information-to-be-filtered list being the object of which the data to be transmitted is desirably reduced, so that the descriptions to be transmitted are decimated and the amount of data is inhibited. For example, exemplarily with the width of the object in the periphery three-dimensional object, width data for each of the objects/obstructions F41 of FIG. 10, is transmitted in accordance with the descriptions to be transmitted in the default. Width data for each of the objects/obstructions F42 is not transmitted in accordance with the descriptions to be transmitted after the filtering. With this arrangement, information can be provided to the user with the amount of data inhibited for the objects/obstructions F42 having the low priority in comparison to the objects/obstructions F41 having the high priority. The method of reducing the amount of data to be transmitted, with the descriptions themselves decimated, has been described with the exemplary periphery-information-based data-to-be-filtered list of FIG. 15, but a method of compressing and transmitting data may be used.

As illustrated in the travelable region adjacency information scene 1 of FIG. 10, a region F45 being the travelable region on the periphery of the vehicle, the region F40 being a region adjacent to the travelable region, and the other region may be prioritized, and then the filter parameter may be calculated with the priority determined for each region. For example, the region F45 being the travelable region on the periphery of the vehicle is set to high priority, the region F40 being the region adjacent to the travelable region is set to medium priority, and the other region is set to low priority. In this case, the filter parameter to the respective different objects/obstructions belonging to the regions, may be varied in accordance with priority. Exemplarily with the periphery-information-based filter cycle list of FIG. 14, two cycles of the default cycle and the filter cycle are defined in FIG. 14. In a case where priority is used, a filter cycle having high priority, a filter cycle having medium priority, and a filter cycle having low priority are individually defined, and then a transmission cycle having a faster value is set to each cycle in order of priority. Similarly, information to be reduced is individually defined based on priority for the periphery-information-based data-to-be-filtered list of FIG. 15.

Next, an exemplary flowchart of filter parameter calculation of calculating the filter parameter output from the filter parameter integration unit 33, will be described with FIG. 16. First, the information-to-be-filtered list is acquired at S21. Next, one piece of object information is selected from the information-to-be-filtered list that has been acquired, at S22. It is checked whether the object classification in the selected information has been registered in the periphery-information-based filter cycle list of FIG. 14, at S23. In the example of FIG. 14, examples of the object classification include the periphery three-dimensional object and the periphery road surface information. In a case where no registration has been made, processing of updating the filter parameter of the selected object information, is skipped. In a case where the registration has been made, a filter cycle corresponding to each description of the selected object, is saved in the filter parameter at S24. Here, each description indicates the object ID or relative position of the object, the lane ID or lane classification of the lane marker in FIG. 14. Next, it is checked whether the selected object classification has been registered in the periphery-information-based data-to-be-filtered list of FIG. 15, at S25. In a case where no registration has been made, the processing of updating the filter parameter of the selected object information, is skipped. In a case where the registration has been made, the description to be transmitted after the filtering corresponding to each description of the selected object, is saved in the filter parameter at S26. Next, it is determined whether all pieces of object information have been selected, at S27. In a case where the selection has not been completed, the processing is repeatedly performed from S22 to S26. In a case where the selection has been completed, the processing of calculating the filter parameter is completed.

Figure 16:
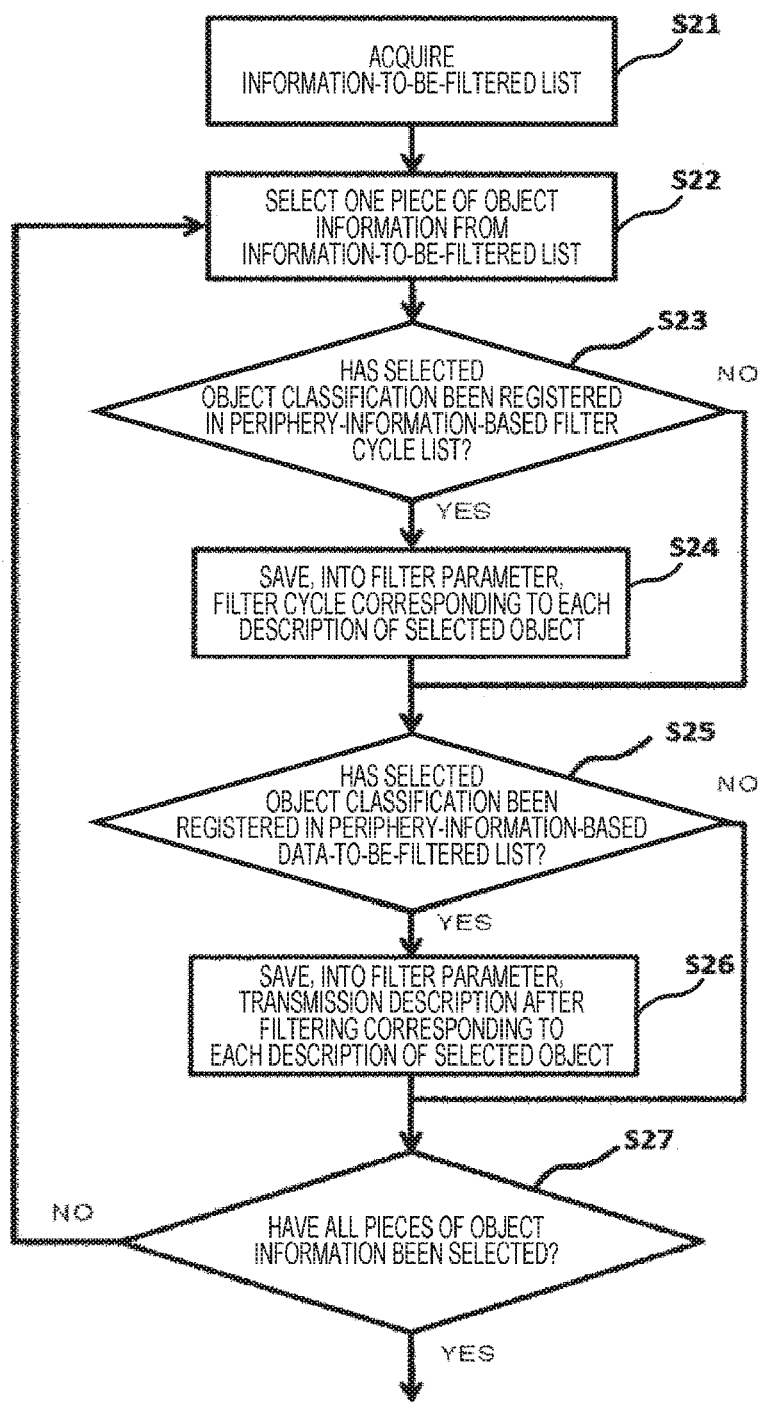
FIG. 16 is a flowchart of filter parameter calculation according to the present invention.

As illustrated in FIG. 4, the filter parameter calculated in the flowchart of FIG. 16 is output to the output data filter unit 11. The output data filter unit 11 determines whether the object for each piece of vehicle periphery information output from the data integration unit 09, has been registered in the filter parameter. The data is reduced with the filter parameter for the object that has been registered, and the data is transmitted with the default set for the object that has not been registered.

Figure 17A:
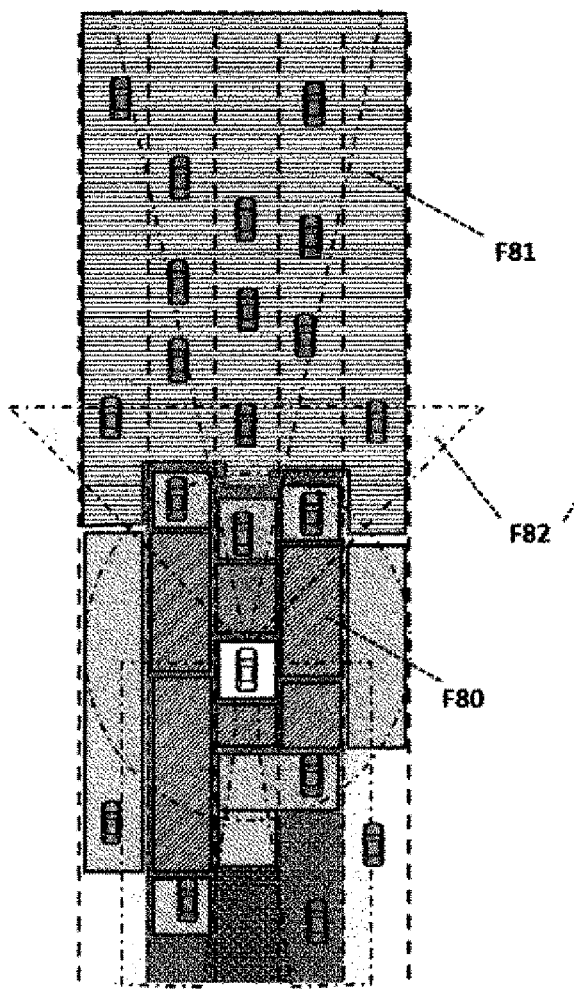
FIGS. 17A and 17B are diagrams describing the comparison between congested traveling and normal traveling according to the present invention.
Figure 17B:
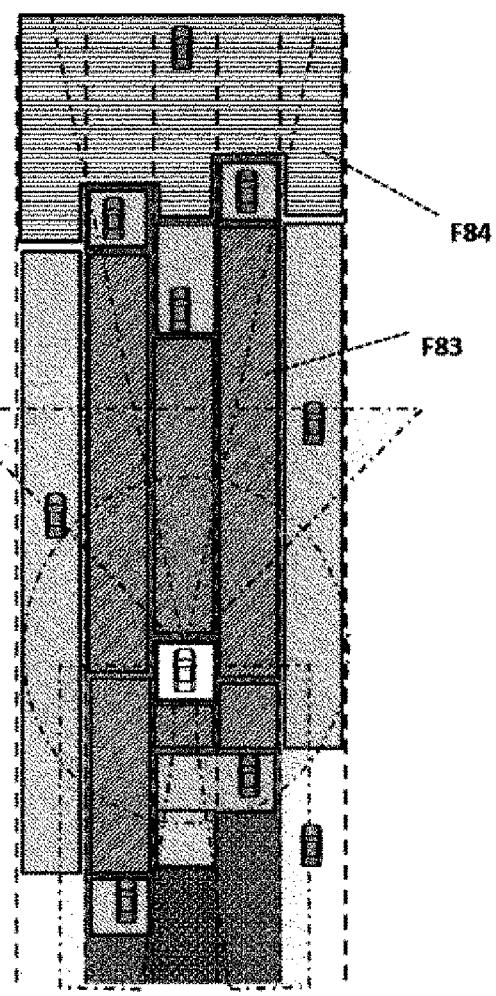

The effect of the present invention will be described with the comparison between congested traveling and normal traveling of FIG. 17. FIG. 17(*a*) illustrates the congested traveling and FIG. 17(*b*) illustrates the normal traveling. The traveling is performed keeping a degree of inter-vehicular distance to a vehicle present ahead of the vehicle in the normal traveling of FIG. 17(*b*) in comparison to the congested traveling. Thus, when the flowchart illustrated in FIG. 6 is used, the travelable region F83 in the normal traveling, expands as the inter-vehicular distance lengthens. Therefore, the region of the travelable region F83 in the normal traveling, occupies a large part of a recognition region F82 of the external environment recognition sensor so that a region F84 to be filtered ahead of the vehicle, narrows and objects/obstructions to be filtered are limited. Note that, the inter-vehicular distance between objects/obstructions is originally wide, and thus the amount of data to be provided is not enormous. In contrast, in the congested traveling of FIG. 17(*a*), a plurality of vehicles ahead of the vehicle, travels at low speed keeping narrow inter-vehicular distances, and thus the range of the travelable region F80 narrows. In comparison to the normal traveling, the region of the travelable region F80 is merely a part of the recognition region F82 of the external environment recognition sensor, and thus a region F81 to be filtered ahead of the vehicle more expands than in the normal traveling. As a result, the number of vehicles detected by the external environment recognition sensor may increase, and thus the amount of information to be provided increases in the conventional processing. According to the present invention, the filter processing is performed to the objects/obstructions included in the region F81 to be filtered so that the amount of data to be provided can be reduced. Therefore, even in a state where the external environment recognition sensor can detect a large number of vehicles as in the congested traveling, the load on the network due to the information provision, can be smoothed. The processing load on the information acquisition side can be reduced.

REFERENCE SIGNS LIST 01 vehicle periphery information management device
02 vehicle behavior recognition sensor
03 external environment recognition sensor
04 map
05 GPS
06 automatic drive control ECU
07 actuation ECU
08 display ECU
09 data integration unit (data acquisition unit)
10 filter parameter determination unit
11 output data filter unit
12 input communication network
13 output communication network
14 data selection unit

The invention claimed is:

1. A processor comprising:
a selection unit configured to select a part of a plurality of types of external environment information around a vehicle, and output the selected information outside, the selection unit being configured to
recognize from the external environment information a travelable region, define a movability region for determining whether the vehicle is able to move
to an adjacent traffic lane of the vehicle, and
when the movability region does not include a part of a different vehicle, recognize a part of a region of information on the adjacent traffic lane as information on the travelable region.

2. The processor according to claim 1, wherein the selection unit is configured to, when the movability region includes at least a part of a different vehicle, not recognize information on the adjacent traffic lane as information on the travelable region.

3. The processor according to claim 1, wherein a size in a front-rear direction of the movability region is set as a value obtained by adding a margin to a size in a front-rear direction of the vehicle.

4. The processor according to claim 1, wherein a size in a lateral direction of the movability region is substantially equal to a width of the adjacent traffic lane.

5. The processor according to claim 1, wherein:
the selection unit is configured to determine the travelable region by comparing a difference between a first distance and a second distance with a threshold,
the first distance is determined on the basis of a distance between the vehicle and a first object present in a traffic lane in which the vehicle is present, and
the second distance is determined on the basis of a distance between the vehicle and a second object present in the adjacent traffic lane.

6. The processor according to claim 2, wherein
when the movability region includes at least a part of a different vehicle, information on the adjacent traffic lane is deleted, and
the deleting includes setting a transmission cycle for information on the adjacent traffic lane to be longer than a default value.

7. The processor according to claim 2, wherein
when the movability region includes at least a part of a different vehicle, information on the adjacent traffic lane is deleted, and
the deleting includes decimating information on the adjacent traffic lane to be transmitted.

8. The processor according to claim 2, wherein
when the movability region includes at least a part of a different vehicle, information on the adjacent traffic lane is deleted, and
the deleting includes compressing information on the adjacent traffic lane to be transmitted.

* * * * *